United States Patent [19]

Taylor et al.

[11] 4,184,169

[45] Jan. 15, 1980

[54] INK-DROP PRINT-HEAD

[75] Inventors: Terrence F. E. Taylor, Burgess Hill; Vishwa N. Bansal, Hove; Peter T. C. Raby, Worthing, all of England

[73] Assignee: International Standard Electric Corporation, New York, N.Y.

[21] Appl. No.: 881,662

[22] Filed: Feb. 27, 1978

[30] Foreign Application Priority Data

Mar. 1, 1977 [GB] United Kingdom ............... 08547/77

[51] Int. Cl.[2] ............................................ G01D 15/16

[52] U.S. Cl. ................................................ 346/140 R

[58] Field of Search .............................. 346/140 R, 75

[56] References Cited

U.S. PATENT DOCUMENTS 3,747,120 7/1973 Stemme ............................ 346/140 R

OTHER PUBLICATIONS

Brownlow et al., Ink on Demand using Silicon Nozzles, IBM Tech. Disc. Bulletin, vol. 19, No. 6, Nov. 1976, pp. 2255–2256.

*Primary Examiner*—Joseph W. Hartary

*Attorney, Agent, or Firm*—A. Donald Stolzy

[57] ABSTRACT

A drop-on-demand ink-drop printer (as opposed to a continuous-droplet-stream printer) has a printhead through which ink flows continuously. In the vicinity of the orifice through which drops are expelled there is a constriction, for instance a Venturi tube, which (a) maintains a negative meniscus at the orifice, and (b) prevents any accumulation of detritus or gas at the orifice. The ink drop is expelled by some form of shock-wave producing means.

3 Claims, 6 Drawing Figures

INK-DROP PRINT-HEAD

This invention relates to ink jet printers.

Most ink-jet printers produce a continuous stream of droplets directed at a record web and deflect the stream to draw characters in either an analogue fashion or a digital fashion. Recently there have been proposals to produce a printer in which the droplets are not produced in a stream but "on demand." See, for example, the proposal of N. G. E. Stemme in the United Kingdom Pat. specification No. 1,356,704, in which a piezoelectric motor "kicks" a droplet of ink from an orifice connected to a reservoir.

According to the present specification there is provided a print-head for an on-demand ink drop printer comprising an orifice plate, a back wall and a side wall member which together bound a chamber which has a restriction in the vicinity of the orifice in the orifice plate; an inlet to the chamber; an outlet from the chamber; shock wave producing means effective to produce, through a wall of the chamber, a shock wave in the chamber; and means for maintaining a continuous flow of ink through the chamber such that ink is contained in the orifice with a negative meniscus except when a shock wave is produced whereupon a single droplet of ink is ejected from the orifice.

Figure 1A:
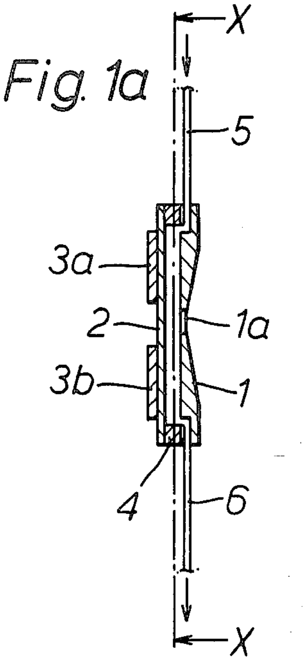
Figure 1B:
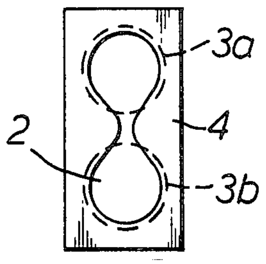
Figure 2A:
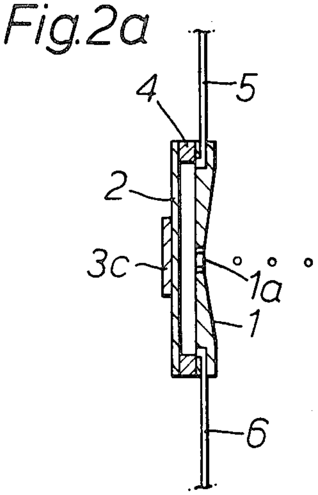
Figure 2B:
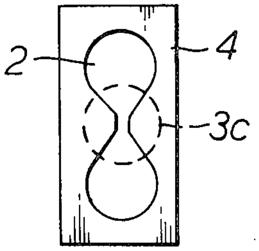
Figure 3:
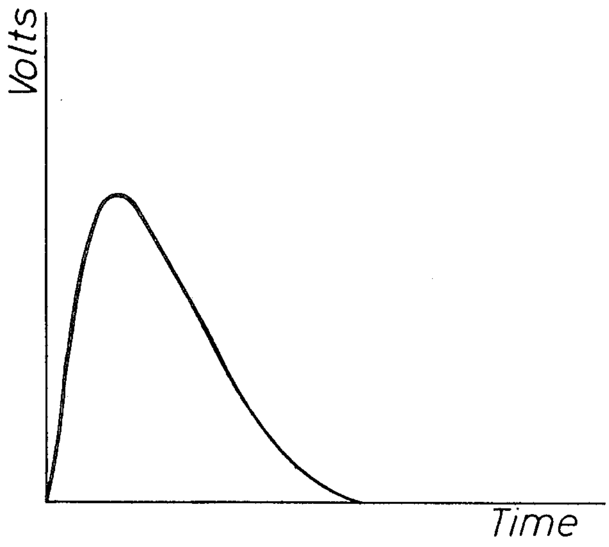
Figure 4:
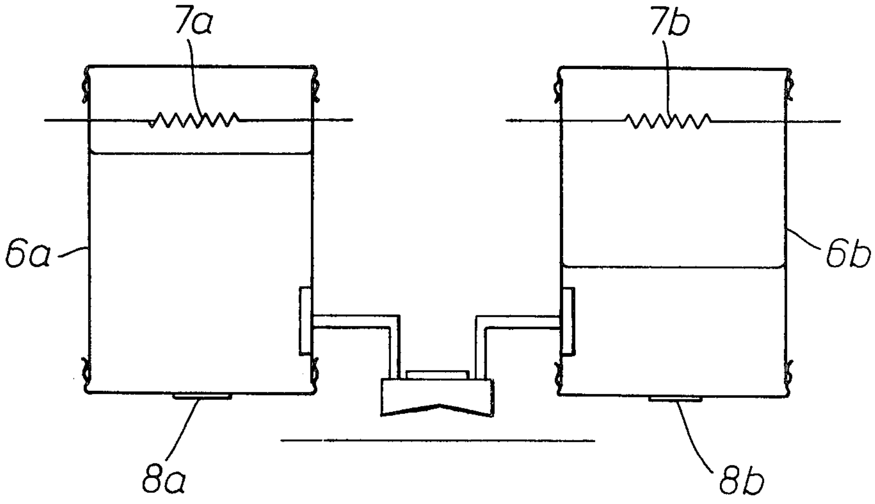

An embodiment of the invention is described below with reference to the accompanying drawings, of which:

FIGS. 1*a* and 1*b* show, respectively, a side elevation of and a section through a printhead;

FIGS. 2*a* and 2*b* shows a side elevation of a modified version of the printhead of FIG. 1;

FIG. 3 shows the wave shape of an actuating electrical pulse for the printhead of FIG. 1 or 2, and FIG. 4 shows an ink supply for the printheads of FIG. 1 or 2.

A print-head for an ink-jet "on demand" printer, FIG. 1*a*, comprises a front wall 1 containing a small orifice 1*a*, a back wall 2, on the outside of which are mounted two piezoelectric motors 3*a* and 3*b*, and a side wall member 4 which in section on the line XX appears as in FIG. 1*b*. Thus within the print-head is a chamber with a constriction, as in a Venturi-tube. An inlet tube 5 leads into the chamber on one side of the constriction and an outlet tube 6 leads out of the tube from the other side of the constriction. The motor 3*a* is adjacent to the inlet of the chamber, the motor 3*b* is adjacent to the outlet of the chamber. Ink passes continuously through the tubes, the chamber, and the constriction, at such an inlet pressure and velocity that in the orifice in the front wall 1, which communicates directly with the constriction, a negative meniscus is maintained.

Because a high flow rate is maintained at the restriction there is an advantageous purging action which prevents any accumulation of detritus or of air in the vicinity of the orifice.

When an electrical impulse is applied to the piezoelectric motors shock waves are produced in the chamber which cause the ink in the orifice to be ejected as a single droplet. On the cessation of the shock the ink is immediately replenished by the continually-flowing stream.

FIGS. 2*a* and 2*b* shows a slight modification to the printhead in that a single piezoelectric motor 3*c* is positioned at the constriction, opposite the orifice 1*a*. In this construction the side wall member 4 must be made of a material sufficiently compliant not to diminish the effect of the impulse caused by the motor.

FIG. 3 shows a suitable wave shape for the electrical impulse to be applied to the piezoelectric motors.

FIG. 4 shows one possible way of supplying the ink to the printhead. Two ink reservoirs 6*a* and 6*b* are connected with the printhead. Each contains liquid ink and a heating element, 7*a*, 7*b*. The reservoirs are gas-tight. Energization of a heating element in one reservoir causes expansion of the vapour therein which forces the ink from that reservoir through the printhead and into the other reservoir. Pressure sensors 8*a*, 8*b* in association with a control unit (not shown) keep the pressure, and therefore the flow rate, within required limits.

We claim:

1. A print-head for an on-demand ink drop printer comprising an orifice plate, a back wall and a side wall member which together bound a chamber which has a restriction in the vicinity of the orifice in the orifice plate; an inlet to the chamber; an outlet from the chamber; shock wave producing means effective to produce, through a wall of the chamber, a shock wave in the chamber; and means for maintaining a continuous flow of ink through the chamber such that ink is contained in the orifice with a negative meniscus except when a shock wave is produced whereupon a single droplet of ink is ejected from the orifice, the side wall member having a cutout interior shaped like an hour glass to give a Venturi-tube effect, the constriction being arranged to be aligned with the orifice in the orifice plate, the inlet entering the chamber on one side of the constriction, the outlet leaving the chamber on the other side of the constriction.

2. A printhead as claimed in claim 1 wherein the shock wave producing means is a pair of piezoelectric motors attached, one on either side of the constriction, to the back wall.

3. A printhead as claimed in claim 1 wherein the shock wave producing means is a single piezoelectric motor attached to the back wall on the opposite side of the constriction from the orifice, and wherein the material of the side wall member is sufficiently compliant not to diminish the effect of the shock wave.

* * * * *